United States Patent [19]

East et al.

[11] 4,085,909
[45] Apr. 25, 1978

[54] COMBINED WARM GAS FIN AND REACTION CONTROL SERVO

[75] Inventors: George F. East, Whittier; Charles E. Hallum, Irvine, both of Calif.

[73] Assignee: Ford Motor Company, Dearborn, Mich.

[21] Appl. No.: 729,512

[22] Filed: Oct. 4, 1976

[51] Int. Cl.² .................... F42B 15/16; F42B 15/18
[52] U.S. Cl. ........................... 244/3.21; 244/3.22
[58] Field of Search ............... 244/3.21, 3.22; 91/48

[56] References Cited

U.S. PATENT DOCUMENTS

| | | | |
|---|---|---|---|
| 3,286,956 | 11/1966 | Nitikman | 244/3.22 |
| 3,415,466 | 12/1968 | Poole, Jr. | 244/3.21 |
| 3,430,536 | 3/1969 | Oelrich | 244/3.21 |
| 3,453,828 | 7/1969 | Rawlings | 244/3.22 |
| 3,637,167 | 1/1972 | Froning, Jr. | 244/3.21 |

*Primary Examiner*—Verlin R. Pendegrass
*Attorney, Agent, or Firm*—John J. Roethel; Keith L. Zerschling

[57] ABSTRACT

A combined reaction nozzle and fin control servo system to provide separate reaction and fin control of a missile for both high and low velocity flight phases. The servo system automatically provides a high gas flow rate for reaction nozzle control and a lower gas flow rate for fin control.

The servo system comprises a gas generator in communication with the reaction nozzles and fins, the flow of gas being regulated by a plurality of dual area piston actuators, control valves and a relief valve.

14 Claims, 3 Drawing Figures

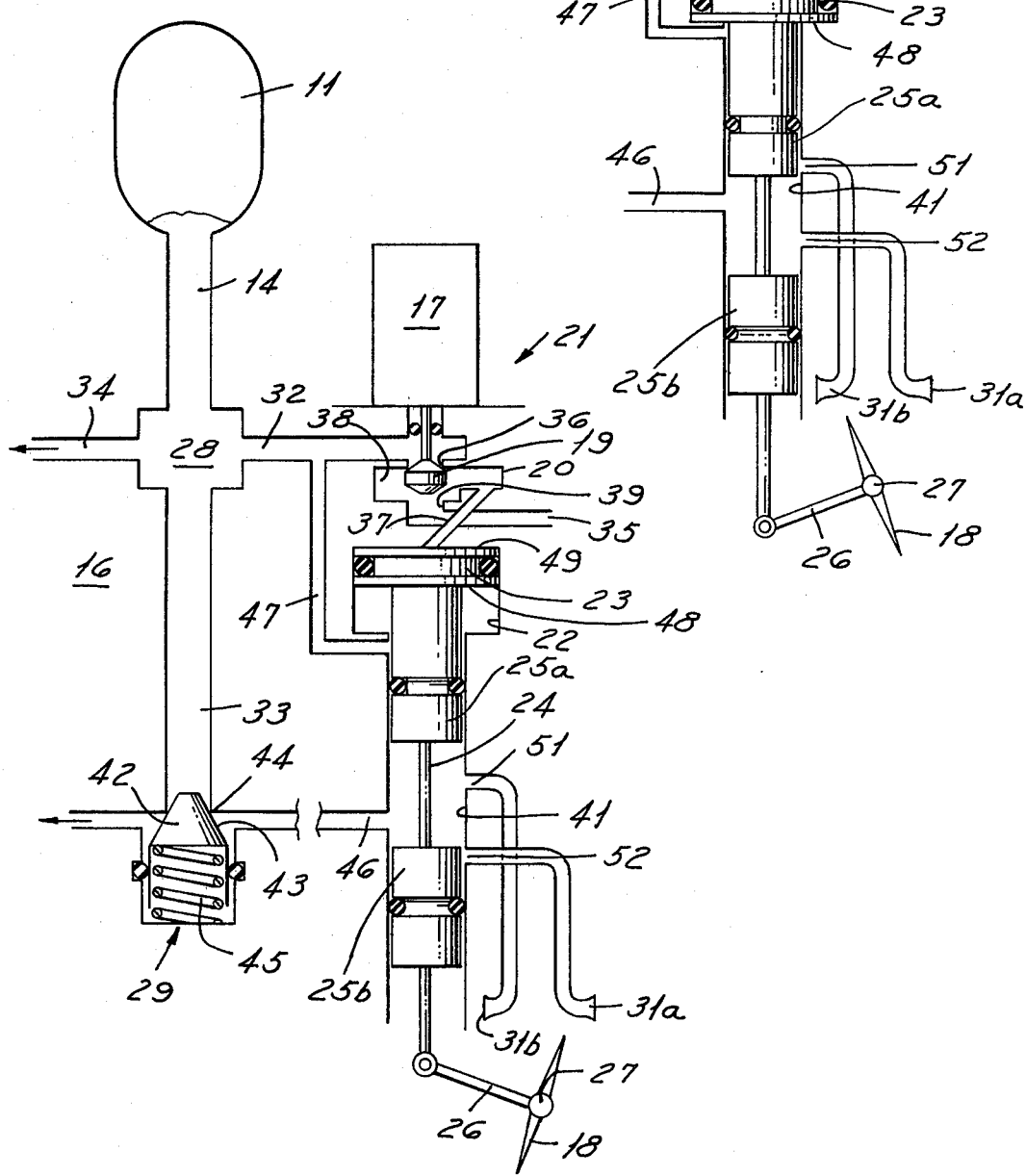

COMBINED WARM GAS FIN AND REACTION CONTROL SERVO

BACKGROUND OF THE INVENTION

When a missile or similar vehicle is ground launched it passes from an initial low velocity launch phase into a subsequent higher velocity flight phase. Full control of the missile from ground launch to target necessitates a control system that provides for ± pitch, ± yaw and ± roll thrust corrections during flight. The missile configuration may include fins and/or reaction nozzles responsive to actuation of the control system.

U.S. Pat. No. 3,304,029 issued Feb. 14, 1967 to N. F. Ludtke for "Missile Directional Control System" discloses a missile having fixed fins and a plurality of reaction nozzles for corrective jet forces.

U.S. Pat. No. 3,692,258 issued Sept. 19, 1972 to T. M. Holland for "Missile Configurations, Controls and Utilization Techniques" discloses a "means for thrust vector directional control" which allows "substantial reduction in cost, weight and aerodynamic drag ... by eliminating large aerodynamic fins and complex fittings required for fin attachment".

U.S. Pat. No. 3,764,091 issued Oct. 9, 1973 to J. A. Crowhurst for "Improvement in or Relating to Control Systems" discloses a steering and propulsion system for a guided missile in which thrust vectoring of the propulsive effluent is achieved by means of a dirigible tail nozzle. The missile configuration includes fins but of the free spinning type.

Also known are missile configurations having a separate fin control system and a separate reaction control system.

SUMMARY OF THE INVENTION

The present invention relates to a reaction nozzle and movable fin servo system for providing reaction and fin directional control of a missile during low and high velocity flight phases. The servo system comprises a gas generator having a stepped flow rate which is high shortly after ignition and low during sustaining operation. A plurality of independent actuator means are each coupled to a movable fin for controlling the aerodynamic orientation of the latter. A control valve means controls gas flow to each actuator means. Each of the actuator means includes diversion valve means for controlling gas flow to reaction nozzles. A manifold having flow passages ducts gas from the gas generator to each control valve means and each diversion valve means. A pressure responsive valve means controls the gas flow through the flow passage connecting the gas generator and the diversion valve means. The pressure responsive valve means is open in response to a relatively high manifold pressure during high gas flow rate thus permitting full flow of gas to the diversion valve means. During low gas flow rate the pressure valve means is normally closed.

DESCRIPTION OF THE DRAWINGS

Further features and advantages of the present invention will be made more apparent as this description proceeds, reference being had to the accompanying drawings, wherein:

FIGS. 2 and 3 are diagrammatic views disclosing the control servo system in two positions of operation.

DETAILED DESCRIPTION OF THE INVENTION

Figure 1:
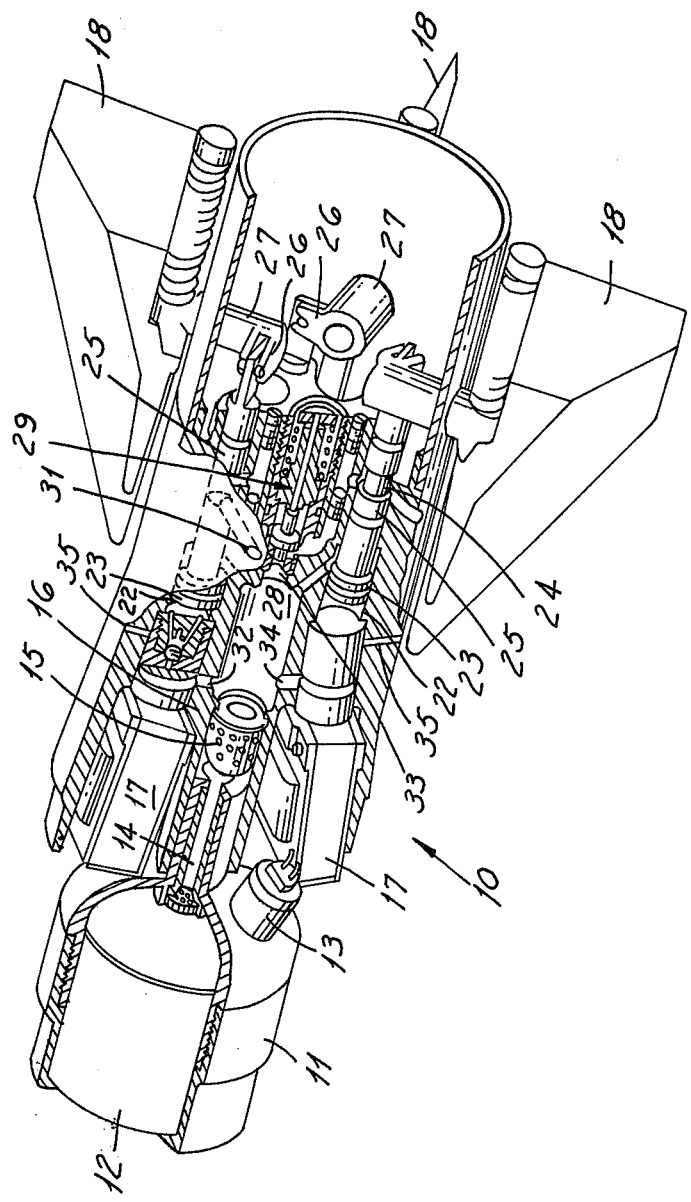
FIG. 1 is a cutaway perspective view of the rear end of a guided missile showing the construction and arrangement of the flight control servo system.

Referring now to the drawings, FIG. 1 represents a cutaway view of a missile flight control servo system, generally designated 10, embodying the present invention. Represented in the cutaway view are a "stepped flow-rate" gas generator 11 containing a solid propellant grain 12. The solid propellant grain 12 provides an initial high gas flow rate shortly after ignition by an igniter 13, and a lower gas flow rate after some specified period of time. The change in flow rate is accomplished by varying the propellant burning surface area: with a larger initial surface area the flow rate is high, and with a lesser surface area the flow rate is reduced. Since the system operates at substantially constant pressure the propellant burning rate is constant and the exhaust gas flow rate is proportional to the burning surface area.

An end burning propellant grain is used. Concentric grooves machined in the grain face (not shown) provide the large initial surface area. The distance between grooves is selected to provide the desired burning duration. When the propellant between the grooves (the web) is consumed, the burning surface is reduced to the circular area at the end of the remaining cylinder of propellant. This surface area remains constant as the propellant burns lengthwise along the cylinder.

This technique is considered state-of-the-art technology in the propellant industry, and further detailed description is not believed necessary for an understanding of the present invention.

The propellant gas from the gas generator 11 is discharged through a conduit 14 through a filter 15 into a manifold 16 having a plurality of flow passageways (to be specifically identified) leading to various components of the servo system.

Encompassing the manifold 16 are a plurality of control valve solenoids 17. Since the missile illustrated has four guidance fins 18, four control valve solenoids 17 are provided (only two being visible in FIG. 1). Each solenoid controls the position of a poppet 19 of a 3-way control valve 20 that controls gas flow to an actuator means, generally designated 21. The actuator means 21 comprises a cylinder 22 housing a piston 23 having a piston rod 24 carrying a spool rod 25. The piston rod 24 is coupled to a fin crank arm 26 carried on the end of a shaft 27 supporting the fin 18 for pivotal movement relative to the longitudinal axis of the missile.

The chamber 28 of the manifold 16 communicates with a pressure responsive or spring-loaded relief valve 29 which controls the flow of propellant to the reaction nozzle, one outlet 31 of which is shown in FIG. 1.

Referring now to FIG. 2, the components of the servo system 10 are shown in diagrammatic relationship. That is, the gas generator 11 is shown in communication with chamber 28 of the manifold 16 through conduit 14. The manifold chamber 28 communicates with a plurality of passageways 32, 33 and 34 to duct gas from the gas generator 11 is several directions. Passageway 32 ducts propellant gas to the 3-way control valve 20 having poppet 19. Passageway 33 ducts propellant gas to the pressure responsive valve 29 and passageway 34 ducts propellant gas to other 3-way control valves associated with actuator means 21 for each of the fins 18.

"3-way" is industry terminology for a 3-ported valve (inlet, cylinder and vent) which permits flow from a supply (inlet passageway 32) to the cylinder 22 while blocking the vent 35, or permits flow from the cylinder 22 to vent 35 while blocking the inlet 32. There is no flow from the inlet 32 to the vent ports 35 except in the transient state.

Referring to the schematic diagram, FIG. 2 shows the valve poppet 19 closing the valve inlet port 36. The cylinder 22 is vented to the atmosphere through a passageway 37 communicating through the poppet chamber 38 with the atmospheric vent 35.

In FIG. 3, the poppet 19 is shown closing the vent port 39 which permits propellant flow from the inlet 32 through the poppet chamber 38 to the passageway 37 leading to one chamber of the cylinder 22.

Since the reaction control system must provide full control of the missile, it is necessary to have ± pitch, ± yaw, and ± roll thrust. Therefore, there are two reactioncontrol vent nozzles 31a and 31b for each piston 23 and they act in opposed directions. The two nozzles 31a and 31b associated with each piston will deliver reaction thrusts in the same directions as aerodynamic lift from the fins will be experienced later in the flight. The given command to the servo results in reaction control forces with the same sign (or polarity) as would be experienced with fin control.

The reaction control system uses spool type diversion valves 25a and 25b which are an integral part of the actuator piston rod 24, the spool valves 25a and 25b being movable within a cylindrical extension 41 of the cylinder 22. The cylindrical extension 41 housing the spool valves 25a and 25b communicate with a duct or passageway 46 that communicates with the pressure responsive or relief valve 29. It is a function of the pressure responsive or spring loaded relief valve 29 to direct propellant flow from duct or passageway 33 to reaction-control/vent nozzles 31a and 31b and to vent excess gas from the generator 11.

The valve 29 also controls the gas generator pressure by providing a variable area orifice. The valve poppet 42 is shown as having a conical shape to provide the variable area orifice between its conical surface 43 and the valve seat 44 when the valve poppet moves out of engagement with the valve seat against the resistance of the spring 45. High pressure propellant gas flow is from the gas generator 11 through the manifold chamber 28 through the conduit 33 through the valve 29, when the latter is open, and then through the conduit 46 into the cylindrical extension 41 for subsequent discharge through the reaction-control/vent nozzles 31a or 31b.

In each actuator 21 the piston 23 is a double acting piston. The piston 23 is acted upon by propellant gas received through the control valve poppet 19 and passageway 37 and is also acted upon by propellant gas received directly from the duct or passageway 32 through a bypass duct or passageway 47 that bypasses the solenoid actuated 3-way control valve 20. Thus, the smaller surface or area 48 of the piston 23 is pressurized continuously through propellant gas received from the bypass 47 while gas pressure acting on the larger piston surface or area 49 is regulated by the position of the poppet 19 as determined by the solenoid 17. As a result, the force tending to raise the duel area piston when the upper end of the cylinder 22 is vented is substantially equal to the force tending to lower the piston when the pressure acting on both sides of the piston is equal. This latter condition occurs when both sides of the piston 23 are in communication with the gas generator 11 through conduit 32.

OPERATION

The gas pressure acting on the larger piston surface or area 49 is regulated by the solenoid controlled poppet 19 operating in a "PDM" mode. "PDM" stands for Pulse Duration Modulation. This is a control technique wherein the valve poppet 19 is cycled between the inlet seat 36 and the vent seat 39 at a constant cyclic rate, but the poppet dwell time on the seats is controlled by varying the solenoid 17 "on" time. With a 0% PDM command the dwell time on each seat is the same and a constant pressure is maintained in the cylinder 22 on the large area side 49 of piston 23. As the PDM command moves from 0 toward −100%, the dwell time on the inlet 36 is increased, the vent 39 is open longer, and the cylinder 22 pressure on the larger side of the piston decreases. At −100% PDM, the fin 19 is driven to the position shown in FIG. 2. That is, the fin is rotated to a maximum clockwise position about the axis of its shaft 27. The spool valve 25a is positioned above the inlet 51 to the nozzle 31b while the spool valve 25b blocks flow of propellant to the inlet 52 of the nozzle 31a. As the PDM command moves from 0 toward +100%, the dwell time of the poppet 19 on the vent seat 39 increases, the inlet 36 is open longer, and the cylinder pressure on the larger side 49 of the piston 23 increases. At +100% PDM command the fin 18 assumes the position shown in FIG. 3. That is, the fin 18 is rotated to a maximum counterclockwise position about the axis of its shaft 27. The spool valve 25a blocks flow of propellant into the inlet 51 of the nozzle 31b while the spool valve 25b has been moved to a nonblocking position relative to the inlet 52 of the nozzle 31a.

At the 0% PDM command the dwell time on each seat 36 and 39 is the same and a constant pressure is maintained in the cylinder 22. The piston 23 would assume a neutral position within the cylinder 22 and the spool valves 25a and 25b would be in partially blocking position relative to the inlets 51 and 52 to the nozzles 31b and 31a, respectively. In this neutral position, the fin 18 is longitudinally aligned with the longitudinal axis of the missle thus providing no aerodynamic lift. If the valve 29 is open permitting propellant flow through conduit 46, the reaction nozzles would discharge equal amounts of propellant in opposite directions thus neutralizing each other.

As noted, propellant flow to the reaction-control/vent system is controlled by the relief valve 29. As manifold pressure increases the relief valve 29 opens proportionally and allows flow to the reaction-control/vent nozzles. The solid propellant gas generator 11 has an initial high flow rate upon ignition and during the low velocity initial flight phase. This is followed by a lower sustaining flow rate during the high velocity flight phase. The initial high flow rate results in a relatively high manifold pressure and the relief valve 29 will be driven open to permit full flow to the reaction-control/vent nozzles. During the sustaining phase of operation, the relief valve 29 normally will be closed. It will open only to vent flow when the control valves are hard-over, and to maintain an essentially constant gas generator pressure over the environmental operating temperature range of the missile.

It is to be understood that this invention is not limited to the exact construction illustrated and described above, but that various changes and modifications may be made without departing from the spirit and scope of the invention as defined by the following claims.

I claim:

1. A reaction nozzle and movable fin servo system for providing reaction and fin directional control of a missile during low and high velocity flight phases, comprising:
   a gas generator having a stepped flow rate that is high shortly after ignition and low during sustaining operation,
   a plurality of independent actuator means each coupled to a movable fin for controlling the aerodynamic lift orientation of the latter,
   a control valve means for controlling gas flow to each actuator means,
   each actuator means including diversion valve means for controlling gas flow to reaction nozzles,
   a manifold having flow passages to duct gas from the gas generator to each control valve means and each diversion valve means,
   and a pressure responsive valve means controlling the gas flow through the flow passages connecting the gas generator and the diversion valve means,
   the pressure responsive valve means being open in response to relatively high manifold pressure during high gas flow rate permitting full flow to the diversion valve means and normally being closed during low gas flow rate.

2. A reaction nozzle and movable fin servo system according to claim 1, in which:
   each actuator means comprises a double acting piston housed within a cylinder,
   and each control valve means comprises a solenoid actuated ported valve having an inlet port, a cylinder port and a vent port,
   the ported valve being constructed and arranged to permit gas flow from the gas generator to the cylinder while blocking the vent port or to permit flow from the cylinder to the vent port while blocking the inlet port.

3. A reaction nozzle and movable fin servo system according to claim 1, in which:
   each actuator means comprises a double-acting piston housed within a cylinder,
   one end of the cylinder being in communication with the gas generator through the control valve means and the other end through a control valve means bypass passage whereby the latter end is pressurized continuously when the gas generator is operative,
   the piston area on the end of the piston acted upon by the pressurized gas entering the cylinder through the control valve means being proportioned relative to the area of the piston acted upon by the pressurized gas received through the bypass passage so that essentially equal force is obtainable in either direction of movement of the piston.

4. A reaction nozzle and movable fin servo system according to claim 3, in which:
   each control valve means comprises a solenoid actuated ported valve having an inlet port, a cylinder port and a vent port,
   the ported valve having a poppet positionable by a solenoid to permit gas flow from the gas generator through the inlet port and the cylinder port to the cylinder while blocking flow through the vent port or to permit flow from the cylinder through the cylinder port and vent port while blocking the inlet port.

5. A reaction nozzle and movable fin servo system according to claim 1, in which:
   each actuator means comprises a double-acting piston housed within a cylinder,
   each piston being coupled to a movable fin by a piston rod,
   the cylinder having a main chamber in which the piston is reciprocable and a cylindrical extension encompassing the piston rod for a substantial portion of the length of the latter,
   and the diversion valve means for each actuator means comprises spool valve means mounted on the piston rod within the cylindrical extension of the cylinder,
   the spool valve means being movable to block gas flow through the cylindrical extension to selected reaction nozzles in synchronism with the movement of the movable fins by the piston and piston rod.

6. A reaction nozzle and movable fin servo system according to claim 5, in which:
   one end of the main chamber of the cylinder is in communication with the gas generator through the control valve means and the other end through a control valve means bypass passage whereby the latter end is continuously pressurized when the gas generator is operative,
   the piston area on the piston end acted upon by the pressurized gas entering the cylinder through the control valve means being proportioned relative to the area of the piston end acted upon by the pressurized gas received through the bypass so that essentially equal force is obtainable in either direction of movement of the piston.

7. A reaction nozzle and movable fin servo system according to claim 6, in which:
   each control valve means comprises a solenoid actuated ported valve having an inlet port, a cylinder port and a vent port,
   the ported valve having a poppet positionable by a solenoid to permit gas flow from the gas generator sequentially through the inlet port and the cylinder port to the cylinder while blocking flow through the vent port or to permit gas flow from the cylinder sequentially through the cylinder port and vent port while blocking the inlet port.

8. A servo system for controlling the flight trajectory of a missile during its low and high velocity flight phases by selective operation of a plurality of reaction nozzles and pivotally mounted fin means, comprising:
   a stepped flow rate gas generator providing high pressure gas flow shortly after ignition and low pressure gas flow during sustaining operation,
   manifold means for distributing the gas through a plurality of primary and secondary passageways,
   a plurality of independent actuator means each in communication with a primary manifold passageway and linked to a movable fin means for controlling the missile steering orientation of the latter,
   and a control valve means in each primary passageway for controlling gas flow to the actuator means in communication with the latter,
   each actuator means including a diversion valve means for controlling gas flow from secondary passageways to the reaction nozzles, and a pressure responsive valve means controlling the gas flow from the gas generator simultaneously to all of the secondary passageways in communication with the diversion valves, the pressure responsive valve means being open during high gas flow rate whereby the reaction nozzles and movable fins coact to guide the missile during the low velocity flight phase and being closed during low gas flow rate whereby the missile is guided solely by the movable fins during the high velocity flight phase.

9. A servo system according to claim 8, in which:

each actuator means comprises a double acting piston housed within a cylinder, and each control valve means comprises a solenoid actuated ported valve having an inlet port, a cylinder port and a vent port, the ported valve being constructed and arranged to permit gas flow from the gas generator to the cylinder while blocking the vent port or to permit flow from the cylinder to the vent port while blocking the inlet port.

10. A servo system according to claim 8, in which:

each actuator means comprises a double-acting piston housed within a cylinder, one end of the cylinder being in communication with the gas generator through a primary passageway and the control valve means associated therewith and the other end through a control valve means bypass passageway whereby the latter end is pressurized continuously when the gas generator is operative, the piston area on the end of the piston acted upon by the pressurized gas entering the cylinder through the primary passageway being proportioned relative to the area of the end of the piston acted upon by the pressurized gas received through the bypass passageway so that essentially equal force is obtained in either direction of movement of the piston when both ends of the piston are in unrestricted communication with the gas generator.

11. A servo system according to claim 10, in which:

each control valve means comprises a solenoid actuated ported valve having an inlet port, a cylinder port and a vent port, the ported valve having a poppet positionable by a solenoid to permit gas flow from the gas generator through the inlet port and the cylinder port to the cylinder while blocking flow through the vent port or to permit flow from the cylinder through the cylinder port and vent port while blocking the inlet port.

12. A servo system according to claim 8, in which:

each actuator means comprises a double-acting piston housed within a cylinder, each piston being coupled to a movable fin by a piston rod, the cylinder having a main chamber in which the piston is reciprocable and a cylindrical extension encompassing the piston rod for a substantial portion of the length of the latter, and the diversion valve means for each actuator means comprises spool valve means mounted on the piston rod within the cylindrical extension of the cylinder, the spool valve means being movable to block gas flow through the cylindrical extension to selected reaction nozzles in synchronism with the movement of the movable fins by the piston and piston rod.

13. A servo system according to claim 12, in which:

one end of the main chamber of each cylinder is in communication with the gas generator through a primary passageway and a control valve means associated therewith and the other end through a bypass passageway whereby the latter end is continuously pressurized when the gas generator is operative, the piston area on the piston end acted upon by the pressurized gas entering the cylinder through the control valve means being proportioned relative to the area of the piston end acted upon the pressurized gas received through the bypass so that essentially equal force is obtainable in either direction of movement of the piston.

14. A servo system according to claim 13, in which:

each control valve means comprises a solenoid actuated ported valve having an inlet port, a cylinder port and a vent port, the ported valve having a poppet positionable by a solenoid to permit gas flow from the gas generator sequentially through the inlet port and the cylinder port to the cylinder while blocking flow through the vent port or to permit gas flow from the cylinder sequentially through the cylinder port and vent port while blocking the inlet port.

* * * * *

UNITED STATES PATENT OFFICE
CERTIFICATE OF CORRECTION

Patent No. 4,085,909　　　　　　　　Dated April 25, 1978

Inventor(s) George F. East and Charles E. Hallum

It is certified that error appears in the above-identified patent and that said Letters Patent are hereby corrected as shown below:

On the Abstract Page, item [73] Assignee, which reads "Ford Motor Company, Dearborn, Michigan" should read --Aeronutronic Ford Corporation, Blue Bell, Pennsylvania--

Signed and Sealed this

Third Day of October 1978

[SEAL]

Attest:

RUTH C. MASON
Attesting Officer

DONALD W. BANNER
Commissioner of Patents and Trademarks